United States Patent [19]

Manzano et al.

[11] Patent Number: 5,054,960
[45] Date of Patent: Oct. 8, 1991

[54] FLOATING BARRIERS FOR CONTAINING OIL SPILLS

[75] Inventors: Rafael Manzano; Anderson Chaviel, both of Caracas, Venezuela

[73] Assignee: Intevep, S.A., Caracas, Venezuela

[21] Appl. No.: 393,931

[22] Filed: Aug. 15, 1989

[51] Int. Cl.$^5$ ............................................. E02B 15/04
[52] U.S. Cl. ...................................... 405/72; 405/63; 405/71
[58] Field of Search ................ 405/63, 72, 64, 68–71, 405/60; 210/242.3, 923

[56] References Cited

U.S. PATENT DOCUMENTS

| | | |
|---|---|---|
| 3,786,637 | 1/1974 | Moramatsu et al. .................. 405/72 |
| 3,852,978 | 12/1974 | Fossberg ........................... 405/72 X |
| 4,073,143 | 2/1978 | Preus ................................. 405/72 X |
| 4,089,178 | 5/1978 | Kinase et al. ..................... 405/72 X |
| 4,270,874 | 6/1981 | March et al. ......................... 405/63 |
| 4,422,797 | 12/1983 | McAllister et al. .............. 405/63 X |

Primary Examiner—Dennis L. Taylor
Attorney, Agent, or Firm—Berman, Aisenberg & Platt

[57] ABSTRACT

Floating barriers are provided with containment means (doublecoated with polyvinyl chloride) of woven twisted nylon thread and with low density polyurethane floating means. The two previous characteristics, along with a change in arrangement, size and shape of other means in current barriers, have surprisingly improved properties, such as wear resistance and use versatility, even under extreme conditions.

19 Claims, 5 Drawing Sheets

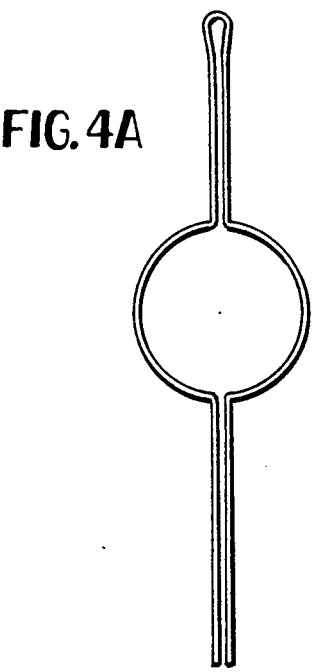
FIG.4A
FIG.4B
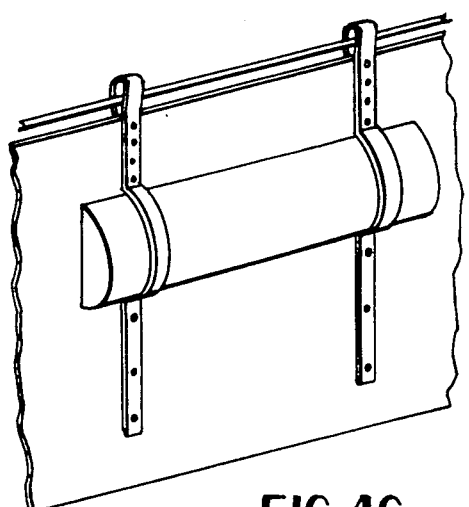
FIG.4C
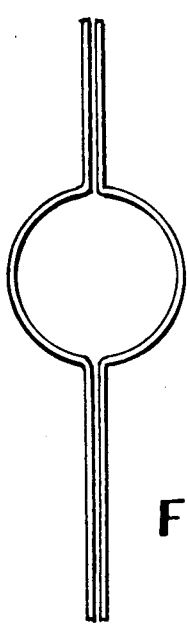
FIG.5B
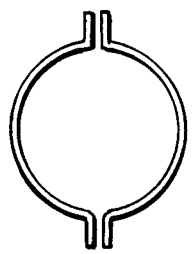
FIG.5A   FIG.5C
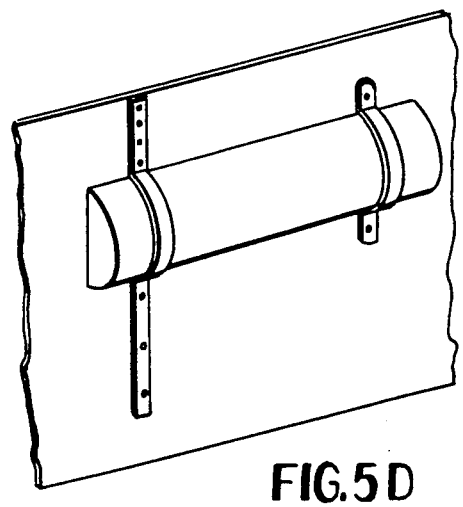
FIG.5D
FIG.6A
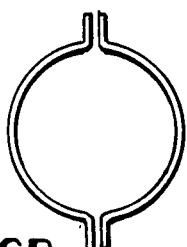
FIG.6B
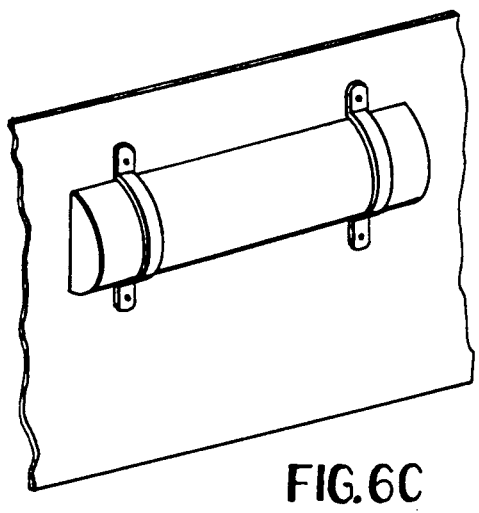
FIG.6C FIG. 8A
FIG. 8C
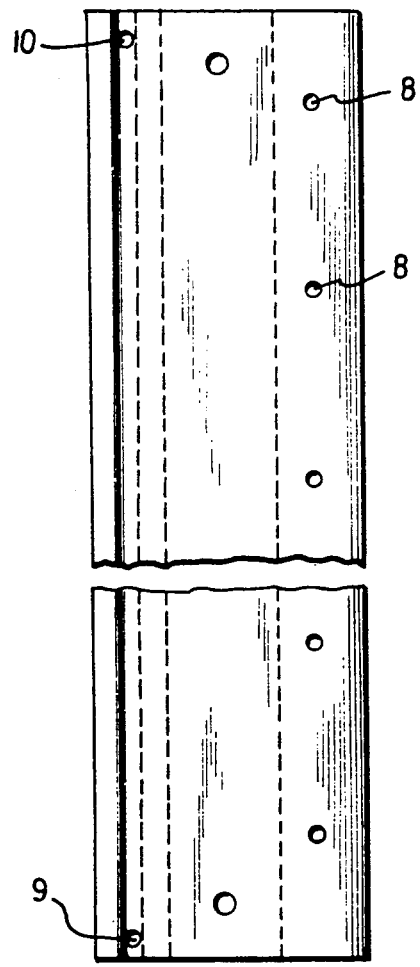
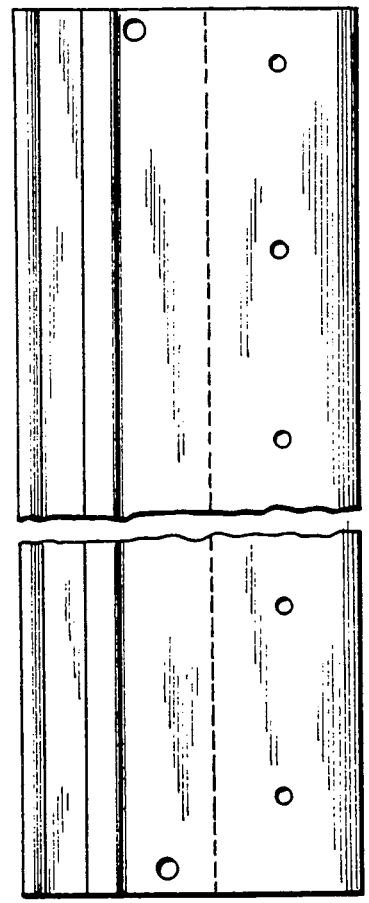
FIG. 8B
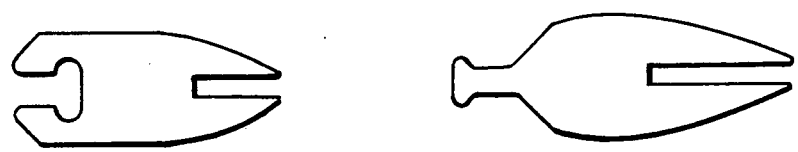
FIG. 8D
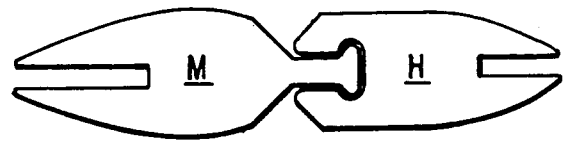
FIG. 8E

FLOATING BARRIERS FOR CONTAINING OIL SPILLS

BACKGROUND

Different types of barriers have been specifically adapted to particular applications. Nave-Boom barriers have a light structure, but they have only slight resistance to longitudinal stress and to the corrosive action of water. Oil-Fence barriers, given their thick weave, are substantially resistant to the corrosive action of water (tested in Maracaibo Lake) and to stress by wind, waves, currents and solid waste. They have orientable floats, are reversible, and occupy little storage space since they are foldable, but they are unstable and unrecoverable. Globe-Boom barriers, also resistant to the corrosive action of water (tested in Maracaibo Lake) and to stress by wind, waves, currents and solid waste, and easy to store, are too heavy and, although easily connectable, they have a coupling that is not universal.

In accordance with U.S. Pat. No. 4,543,012, barriers referred to therein possess a relief pocket for the pollutant, but they are effective only in still water. The barrier of U.S. Pat. No. 4,300,857 is adjusted to the seabed, thus retaining the water, but it is rigid and can be used only in still and not too deep waters.

SUMMARY OF THE INVENTION

With regard to existing barriers in the market, Barriers I, II, and III solve several of the most critical problems faced in this technology. Because of the weave of twisted nylon thread, the containment means provides higher resistance to longitudinal stresses, which means higher versatility in its application. By providing fixing means basically made out of aluminum, stability is increased, on the one hand, to face the environment's corrosive action and, on the other hand, with regard to the pressure exerted by current against the barrier. With lower rigidity in structure, it is thus possible to control oil spills efficiently.

The barriers have a number of distinct aspects which, individually and in different combinations, contribute substantially to the subject invention.

a) their essential components are containment means, floating means, fixing means and ballast means, b) the containment means (when floated in water) consist of a screen or curtain having an above-water zone (freeboard) and a submerged zone (skirt or flap), c) the floating means keep the containment means afloat when the latter is placed in water, d) the fixing means secure the floating means to the screen or curtain and impart stability to the containment means, e) the ballast means maintain the screen or curtain substantially vertically disposed when the containment means is floated in water, f) the screen or curtain is of woven twisted nylon thread, g) the screen or curtain is coated on both sides with water-resistant polymer, h) the water-resistant polymer is PVC, i) the floating means have a density of from 70 to 170 g/l, j) the fixing means comprise aluminum straps, k) the ballast means comprise a ballast chain secured to the skirt or flap, and l) steel wire rope tensioning means are provided along and secured to the freeboard.

BRIEF DESCRIPTION OF FIGURES

FIGS. 4A-C, 5A-D and 6A-C are transverse sections of float supports of Barriers I, II, and III, respectively.
FIGS. 8A-E are side and plan views of the coupling for Barriers I and II.

DETAILS

Tensioning Means

Figure 1:
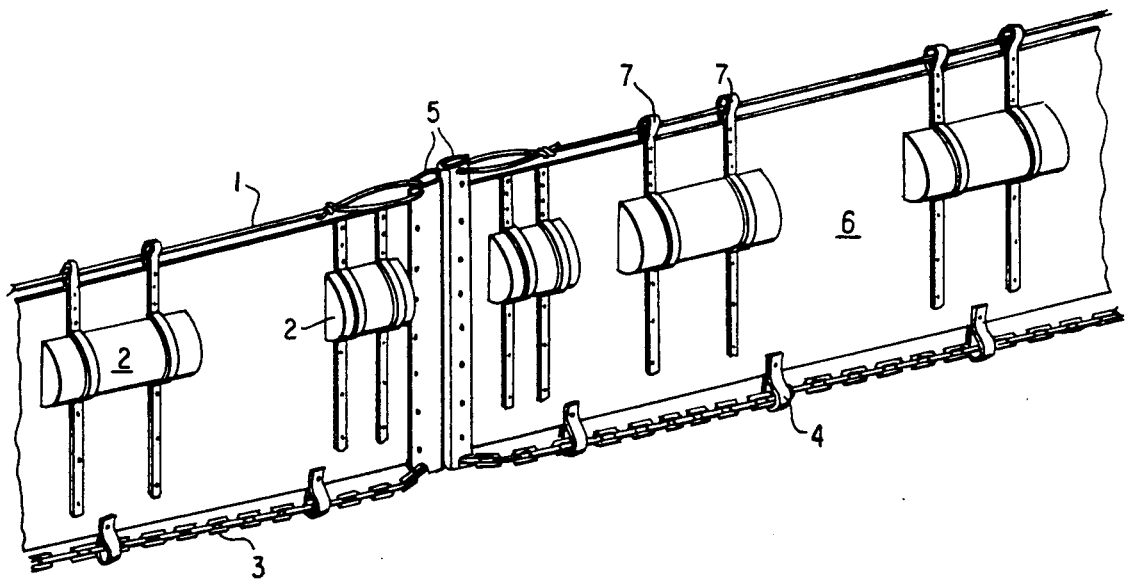
FIG. 1 is a perspective view of Barrier I.

The tensioning means (1) of Barrier I is located in the upper part of said barrier (FIG. 1). It consists, e.g., of a steel wire rope that has been twisted from four to seven times with from 15 to 56 threads, thus obtaining a thickness of from 0.45 to 2.0 cm.

A preferred tensor element wire rope is one of 7 turns and 19 threads (e.g. NSR, 7×19) with a diameter between the values of 3/16 inch and ¼ inch (0.476 cm and 0.635 cm). This kind of wire rope combines flexibility with fatigue resistance and corrossion resistance ("Handbook or Ocean and Underwater Engineering", by J.J. Meyers, C.H. Holm and R.F. McAllister). Alternative tensioning means with similar properties are known and available. The wire rope is coated with a rubber hose, not shown in the figure, to avoid wear of the support plate (7) (FIG. 1). Barrier II does not have tensioning means (1) since it includes a thicker ballast chain that allows it to absorb longitudinal stresses. Barrier III has a ballast chain that is able to exert a double function as a stabilizing and a tensioning means (given its size), and its use is recommended in places where water currents are not too strong.

Floating Means

Figure 2:
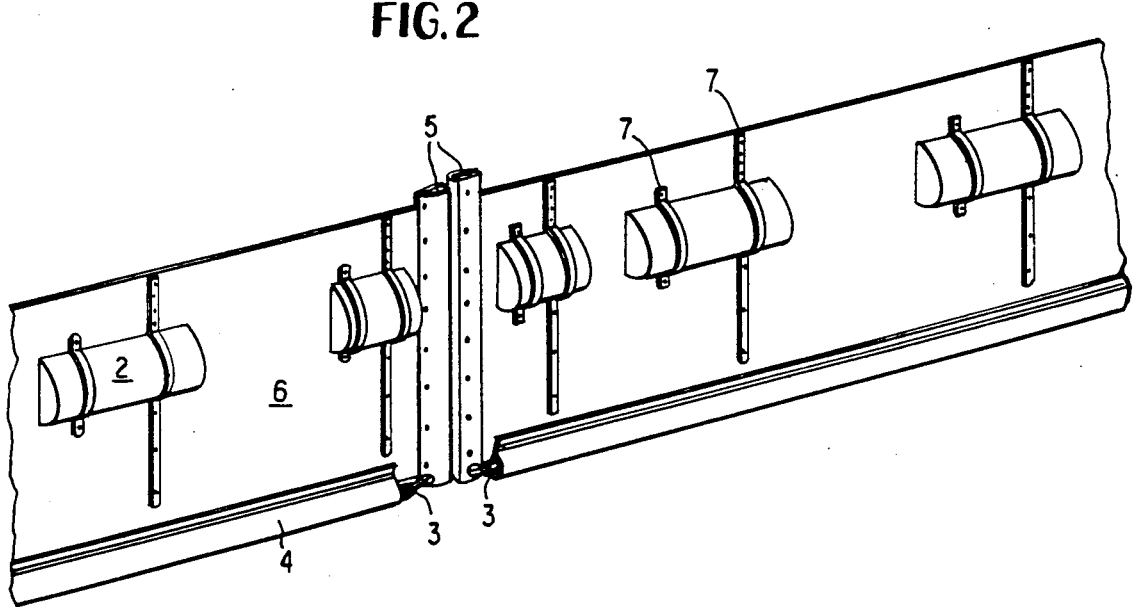
FIG. 2 is a perspective view of Barrier II.
Figure 3:
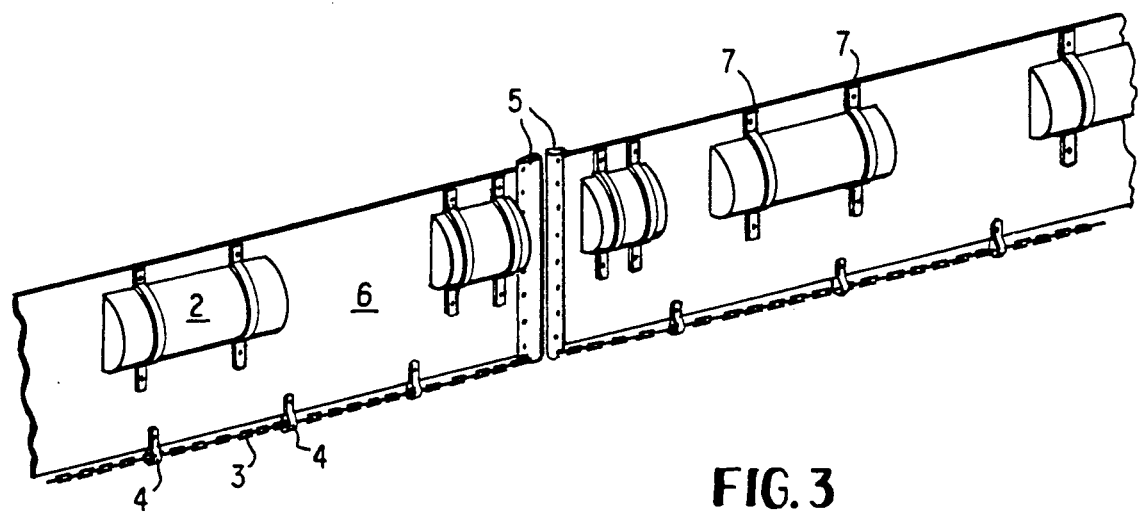
FIG. 3 is a perspective view of Barrier III.

The floating means (2) (FIGS. 1, 2 and 3) are identical for the three barriers and consist of cylindrical devices, having, e.g., a diameter between 20 and 22 cm and a length from 49 to 51 cm, spaced about each 35 to 45 cm and preferably throughout the barrier. Said arrangement, together with the float size, eliminates the relative rigidity that creates fragility when known barriers receive an impact.

The devices are preferably made from rigid aromatic polyether polymer (e.g. SINTHEMAD-90) with a model density in the range of from 130 g/l to 170 g/l conferring resistance/bouyancy characteristics. The water absorption of such polymer is low, since it has a high percentage of closed cells and a compact surface skin that strongly resists water absorption.

Said cylinders consist of two symmetrical convex covers fixed to the barrier's skirt (6) (FIGS. 1, 2 and 3) by means of a pair of aluminum straps. The cylinders are made out of a polyurethane having a molded density between 70 and 90 kg/m³, which gives them a buoyancy that is from four to five times the barrier's weight. With this excellent flotation capability, said material also increases their useful life and durability since they undergo wear "by layers" and not by breaking or cracking when faced with saltpeter, sunlight, meteorological conditions, etc.

Floats are preferably made of a low density polyurethane (e.g. that manufactured by the MONOMEROS COLOMBO-VENEZOLANOS industry). Said polyurethane has the following advantages with regard to polyurethane of commercial barriers: first, its molecular structure avoids easy water "soaking" and is responsible for floats wearing "by layers" with no channel formation, which greatly reduces float cracking probabilities; second, it features better fire-resistance.

Containment Means

This consists of a screen or a curtain (6) (FIGS. 1, 2 and 3) which maintains a zone above the water surface, that is to say the freeboard, and a submerged zone called skirt or flap. Said curtain is approximately from 14 to 16 m long and from 0.75 to 0.85 m wide for Barriers I and II, and from 14 to 16 m long and from 0.35 to 0.45 m wide for Barrier III.

The length of each barrier section is about 15m for each of the three types (models). With the indicated materials, the dimensions that succeed best in joining flexiblity and stability are found in a length range of from 14 to 15 m per barrier section. The width of barriers I and II is preferably in the range of from 0.70 m to 1.00 m and that for barrier III if from 0.35m to 0.45 m. The weave said flap is made out of consists of a twisted nylon thread. The nylon (preferably Nylon-6) is reinforced with from 5 to 10% fiberglass and an ultraviolet-ray-resistant additive (TINUVIN ™). The thread is twisted to increase its resistance. Then, warping and winding of the twisted thread takes place, and the required weave is conventionally manufactured in a loom. Immediately thereafter, scouring of the weave is performed. A plastisol is prepared, as well-known in the art, from a polyvinyl chloride (e.g. PVC-360) to coat the weave on both sides. Said polyvinyl chloride (PVC) coating is made in two rolling furnaces, both at a temperature of about 170° C.

PVC-360 polymer has the following characteristics:

| K Value<br>Immediate Brooksfield | 80 + 2<br>(min.) (max.) |
| --- | --- |
| Viscosity | 3,000–10,000 cps |
| Brooksfield viscosity after 24 hours | 10,000–30,000 cps |
| Moisture | 0.15% |
| Apparent Density | 0.25–0.32 gr/mm$^3$ |

In the case of Barrier II, the weave is double-coated on each side, thus increasing thickness and, consequently, rigidity. The object of this variant with regard to the other two types is that it is intended for permanent use in sites with strong current and wave action.

Traction tests were conducted on wave samples from said flap having dimensions of about 2.5 cm wide and 1 to 1.5 mm thick. The following breaking stress values were obtained: 507 Kg/cm$^2$ for Barriers I and III, and 737 Kg/cm$^2$ for Barrier II, the weave high stress-resistance being thus demonstrated.

A traction test carried out on the threads of Barriers I, II and III yielded the following results:
Threads of Barriers I and II
For 0.45 cm wide strips per 0.1 cm thick
Average breaking load, 200 lb.
Average breaking stress, 7,200 lb/sq.inch For 0.54 cm×0.15 cm strips
Average breaking load, 515 lbs.
Average breaking stress, 10,400 lbs/sq. inch.

Fixing and Support Means

A couple of aluminum plates (7) (FIGS. 1 to 6) are provided as fixing or support means of floats. Said plates are riveted to the skirt body. In the case of Barrier I, the plates extend over the freeboard, as a horseshoe, which permits lining up the tensioning means with the containment means.

In the case of Barriers I and II, said plates increase stability since they maintain the containment means vertically.

Figure 7A:
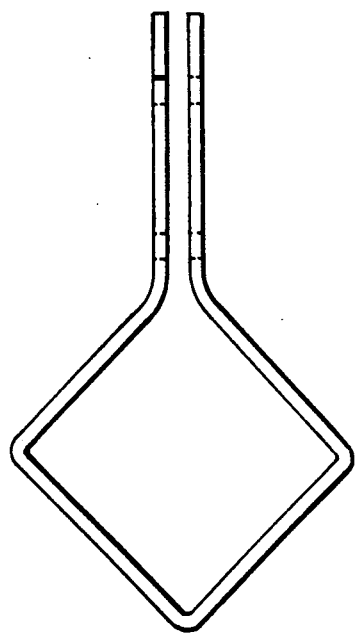
FIGS. 7A-B are from an end view of the support for the ballast chain.
Figure 7B:
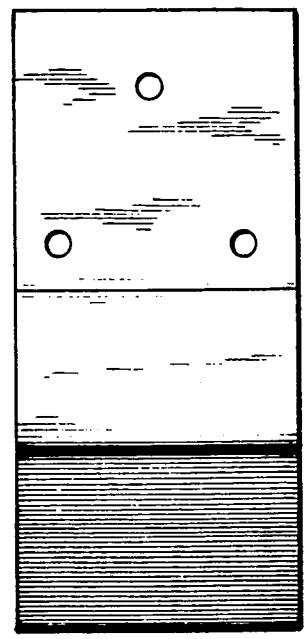
Figure 9A:
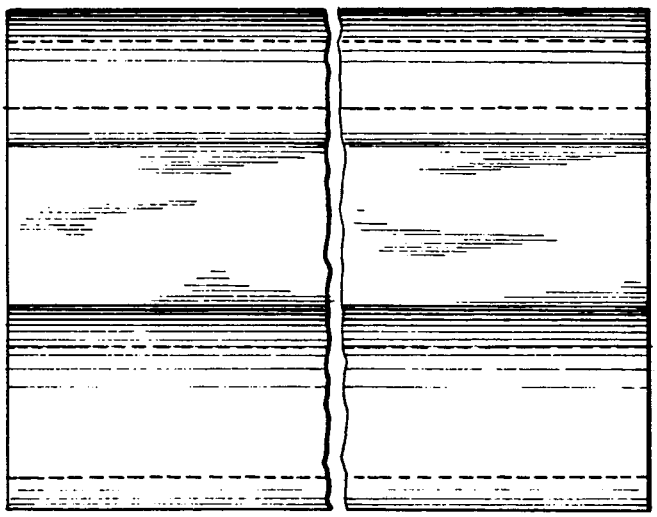
FIGS. 9A-D are side and plan views of the coupling for Barrier III.
Figure 9B:
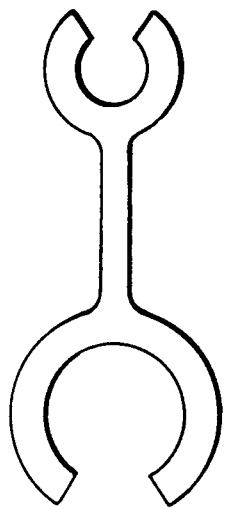
Figure 9C:
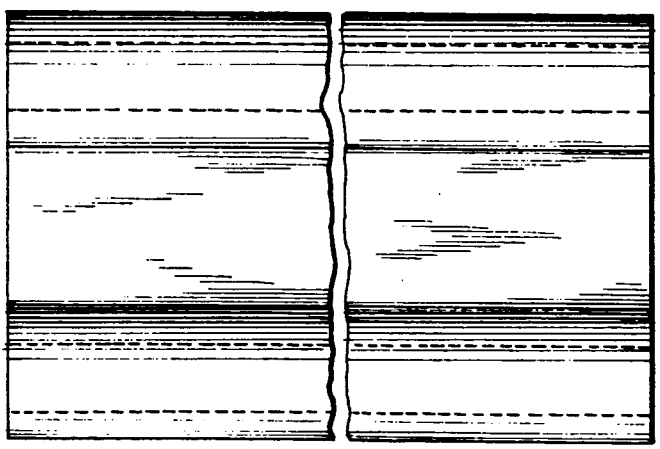
Figure 9D:
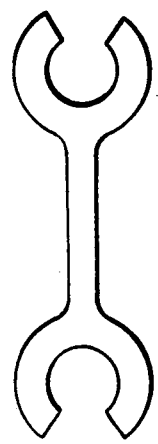

Square aluminum rings riveted to the skirt work as support means (4) (FIGS. 1, 3 and 7) and are used to line up the ballast chain (3) all along the barrier. In Barrier II, they have been replaced by a cover or a pocket (8) made out of the same material as the skirt and hermetically sewn to it also with nylon, covering the chain longitudinally. The variant's intention is to distribute the chain's weight uniformly all along the skirt's length, since the latter is thicker and, therefore, heavier than the other two models (I and III).

Ballast Means

The ballast means consists of a galvanized steel chain (3) (FIGS. 1 to 3) from 14 to 15 m (preferably 14.5 m) long and from 0.82 to 0.88 cm thick in models I and III, and a similar length and from 1.24 to 1.30 cm thick in Barrier II. Such means function as an additional tensioning means in order to support longitudinal stresses better.

Connecting Means

These consist of male-female couplings (5) (FIGS. 1, 2 and 3) that link the barrier sections or portions. Said couplings are aluminum (e.g. A3334 series, manufactured by the Venezuelan industry ALCANVEN) planar bars that have grooves and holes on the end opposed to the connection serving as the flap's clamping area. The male-female coupling means are universally known. Couplings used in the present invention are displayed in two different designs, both showing the same efficiency. FIG. 8 shows coupling means useful in Barriers I, II and III. This figure shows holes made in the aluminum bar: a) to clamp the cloth (holes 8 of approximately 7 mm in diameter), b) to clamp the ballast chain (holes 9 of approximately 7 mm in diameter), and c) to clamp the tensioning wire (holes 10 of approximately 7 mm in diameter).

The cloth width (or flap) is trapped in said coupling's longitudinal groove and additionally fixed with bolts that go through a fold made in that very end of the cloth, a plate that also has grooves and that has been wrapped in said fold, and the coupling itself.

Specific Aspects of Each Type of Carrier

Barrier I is appropriate for bays and ports and/or wherever a long stay is not required. It has been designed for a rapid deployment from a medium-size craft. The combined effort of the tensioning wire rope and the ballast chain make it particularly resistant to longitudinal stresses.

This barrier can be vertically thrown into the water at a place of interest, and deployed according to any of U, V, J or O configurations, allowing for effective containment due to the flexibility of the weave it is made of.

It can be handled from medium-size crafts. Also, it is possible to achieve rapid deployment with a maximum of four men by holding the barrier by its tensioning means, which can be readily done due to its light weight. When used offshore, sections are previously coupled to two crafts, and stored in a zig-zag arrangement in order to save storage space, while avoiding overlapping floats. Both the freeboard (approximately 35 cm) and flap (approximately 45 cm) dimensions account for an ideal relationship that allows a combination of stability and containment capability resulting in higher barrier efficiency.

Barrier II is adequate for places with winds up to 70 Km/h and currents up to 1.5 knots. It can keep operating for more than a year. The weave's thickness guarantees optimum penetration in water and increased capacity in containing crude oil.

This barrier is similar to model I barriers with respect to deployment. As it is heavier, up to six men are required for handling it. Since it is not provided with any tensioning means on the upper part, it must be held by the flap itself to be thrown into the water, with no risk of tearing because the weave in this model is thick enough so as to stand such stress.

Barrier III is suitable for spills requiring easy handling and occupation of a reduced area.

Only two men are required for deployment for it is lighter and smaller than Barriers I and II. It proves particularly useful as a deviation barrier.

The male-female coupling means in the three models of barriers has an approximate weight of 8 Kg regardless of the design, and it is heavier than coupling means in barriers already known. In this way, barrier stability is increased.

The invention and its advantages are readily understood and appreciated from the foregoing description. Various changes may be made in individual components without departing from the spirt and scope of the invention or sacrificing its material advantages. The described barriers are merely illustrative of preferred embodiments of the invention.

What is claimed is:

1. A floating barrier for containing oil spills and consisting essentially of:
   a) containment means,
   b) floating means,
   c) fixing means and
   d) ballast means;
   the containment means, when floated in water, having an upper edge and a lower edge, and comprising an above-water zone or freeboard and a submerged zone or skirt or flap; said containment means consisting of a screen or curtain of woven twisted nylon thread coated on both sides with water-resistant polymer;
   the floating means being remote from the upper edge and from the lower edge of the containment means and comprising means to keep the containment means afloat when said containment means is placed in water;
   the fixing means comprising a plurality of integral and unitary means to secure the floating means to the screen or curtain and concurrently to impart stability to the containment means; said fixing means extending toward, but terminating at a position remote from, the lower edge of the containment means;
   the ballast means comprising means attached to the skirt or flap for maintaining the screen or curtain substantially vertically disposed when the containment means are floating in water.

2. A floating barrier according to claim 1 wherein the water-resistant polymer of the coating on the screen or curtain is PVC, the floating means are substantially regularly spaced along the containment means and are composed of material having a density of from 70 to 170 g/l, and the fixing means comprise aluminum straps.

3. A floating barrier according to claim 2 wherein the floating means comprises of polyurethane having a density of from 70 to 90 g/l.

4. A floating barrier according to claim 1 wherein the ballast means comprise a ballast chain supported by aluminum rings secured to the skirt or flap.

5. A floating barrier according to claim 1 wherein the ballast means comprise a ballast chain supported by a nylon sleeve or pocket which covers the chain and is secured to the skirt or flap.

6. A floating barrier according to claim 5 wherein the sleeve or pocket is of woven twisted nylon thread and is sewn along its entire length to the containment means.

7. A floating barrier according to claim 1 having a steel wire rope tensioning means longitudinally disposed along and adjacent to the upper edge of and secured to the containment means.

8. A floating barrier according to claim 1 wherein the screen or curtain is coated on each face with one or two layers of polyvinyl chloride (PVC), 9. A plurality of floating barriers, each of which is connected to one or two adjacent barriers by coupling means and each of which is a floating barrier according to claim 1.

10. A floating barrier according to claim 1 wherein the containment means is of interwoven twisted thread and the polymer with which it is coated is polyvinyl chloride (PVC) polymer; the floating means comprises two substantially semicircular halves of slid polyurethane cylinders symmetrically disposed on opposite sides of the containment means; the fixing means comprises metallic plates or straps for supporting the floating means and for securing tensioning means to the freeboard; the ballast means comprises a chain secured to, adjacent and substantially commensurate in length with the skirt or flap; and tensioning means comprising a) the ballast means and b) wire rope secured to the freeboard by the fixing means.

11. A plurality of floating barriers, each of which is a floating barrier according to claim 10, and each is secured to an adjacent barrier by coupling means.

12. A floating barrier for containing oil spills in combination with tension means, the floating barrier consisting essentially of:
   a) containment means,
   b) floating means,
   c) fixing means, and
   d) ballast means;
   the containment means, when floated in water, having two-side edges, an upper edge and a lower edge and comprising an above-water zone or freeboard and a submerged zone or skirt or flap; said containment means consisting of a screen or curtain;
   each of the floating means comprising two halves of slid cylinders symmetrically placed on opposite sides of the containment means and having an axis parallel to the upper edge of the containment means; said floating means being remote from both the upper edge and the lower edge of said containment means;

fixing means comprising plates which secure said floating means to said containment means and extend normal to the axis of the floating means in one direction over the upper edge of the containment means and in the opposite direction only part way toward the lower edge of said containment means; and the ballast means comprising means attached to the skirt or flap for maintaining the screen or curtain substantially vertically disposed when the containment means is floating in water; and the tensioning means being secured to the barrier by portions of the fixing means plates which extend over the upper edge of the containment means.

13. A floating barrier according to claim 12 wherein the tensioning means comprise wire rope longitudinally disposed along and adjacent to the upper edge of the containment means.

14. A floating barrier according to claim 13 wherein the fixing means plates are aluminum plates.

15. A floating barrier according to claim 14 wherein the ballast means comprise a ballast chain supported by the skirt or flap and extending substantially coextensively along the length of said skirt or flap.

16. A floating barrier according to claim 15 having a planar bar secured along one or each side edge with substantially coextensive means to couple the floating barrier to another similar floating barrier having complementary coupling means substantially coextensive with its corresponding planar bar.

17. A plurality of floating barriers, each of which is connected to one or two adjacent barriers by its coupling means, each of which is a floating barrier according to claim 16, and wherein the coupling means are male-female coupling means.

18. A floating barrier according to claim 15 wherein the containment means consists of a screen or curtain of woven twisted nylon thread coated on both sides with water-resistant polymer.

19. A barrier for containing oil spills comprising:

a) containment means,
b) floating means,
c) fixing means,
d) connecting means,
e) ballast means, and
f) tensioning means;

the containment means, when floated in water, having an upper edge, a lower edge, a longitudinal axis midway between the upper and lower edges, and two side edges, and comprising an above-water zone or freeboard and a submerged zone or skirt or flap; said containment means consisting of a coated screen or curtain of interwoven and twisted thread, the screen or curtain being coated on both sides with water-resistant polyvinyl chloride polymer;

each of the floating means being in the form of two halves of a solid cylinder placed symmetrically on opposite sides of the screen or curtain, each solid cylinder being made of superposed layers of polyurethane, having an upper edge and a lower edge and being positioned so that its lower edge substantially coincides with the longitudinal axis of said containment means;

the fixing means comprising aluminum plates which secure said floating means to the containment means, which extend upwardly from the floating means and form a passage for wire rope beyond the upper edge of the containment means and which extend downwardly from the floating means to a position remote from the lower edge of said containment means;

the connection means comprising male-female couplings substantially coextensive with and along the side edges of adjacent containment means;

the ballast means being a chain secured to and substantially coextensive with the lower edge of said containment means, and the tensioning means comprising wire rope extending through the passage provided by the fixing means along and substantially coextensive with the upper edge of the containment means in combination with the ballast means.

* * * * *

UNITED STATES PATENT AND TRADEMARK OFFICE
CERTIFICATE OF CORRECTION

PATENT NO. : 5,054,960
DATED : October 8, 1991
INVENTOR(S) : Rafael Manzano, et al It is certified that error appears in the above-identified patent and that said Letters Patent is hereby corrected as shown below:

Title page, left column, item [73], "Intevep, S.A." should read --Maraven, S.A.--. Column 2, line 11, "end view" should read --end and front view--. Column 3, line 21, "15m" should read --15 m--; line 27, "if" should read --is--; line 31, "TINUVIN TM" should read --TINUVIN™--; line 47, in the table, lower "10,000-30,000 cps" so that it is in the same column, but adjacent "after 24 hours"; line 57, "wave" should read --weave--. Col. 6, Claim 3, line 2, "comprises of" should read --comprises--. Claim 8, line 3, "(PVC)," should read --(PVC)--. Claim 10, line 5, "slid" should --solid--. Claim 12, line 2, "tension" should read --tensioning--; line 9, "two-side" should read --two side--; line 15, "slid" should read --solid--.

Signed and Sealed this

Eleventh Day of May, 1993

Attest:

Attesting Officer

MICHAEL K. KIRK

Acting Commissioner of Patents and Trademarks